(12) United States Patent
Yamagami

(10) Patent No.: US 6,432,575 B1
(45) Date of Patent: Aug. 13, 2002

(54) BATTERY PACK

(75) Inventor: Yasuhiro Yamagami, Tsuna-gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/510,310

(22) Filed: Feb. 22, 2000

(30) Foreign Application Priority Data

Feb. 23, 1999 (JP) .......................................... 11-044631
Feb. 24, 1999 (JP) .......................................... 11-045790

(51) Int. Cl.[7] .............................................. H01M 2/10
(52) U.S. Cl. .......................... 429/100; 429/57; 429/61; 429/90; 429/7
(58) Field of Search ........................... 429/100, 97, 96, 429/90, 61, 62, 64, 53, 54, 58, 57, 181, 186, 7

(56) References Cited

U.S. PATENT DOCUMENTS

| | | |
|---|---|---|
| 4,035,552 A | 7/1977 | Epstein |
| 4,788,112 A | 11/1988 | Kung |
| 5,654,114 A * | 8/1997 | Kubota et al. ............... 429/218 |
| 5,705,290 A | 1/1998 | Azema |
| 5,993,990 A * | 11/1999 | Kanto et al. .................. 429/62 |
| 6,048,637 A * | 4/2000 | Tsukahara et al. ............ 429/53 |

FOREIGN PATENT DOCUMENTS

| | | |
|---|---|---|
| EP | 0 228 983 | 7/1987 |
| EP | 0 674 351 | 9/1995 |
| EP | 0 844 622 | 5/1998 |
| FR | 2 743 452 | 7/1997 |
| JP | 8-31460 | 2/1996 |
| JP | 11-154504 | 6/1999 |

* cited by examiner

*Primary Examiner*—Stephen Kalafut
*Assistant Examiner*—R. Alejandro
(74) *Attorney, Agent, or Firm*—Wenderoth, Lind & Ponack, L.L.P.

(57) ABSTRACT

The battery pack o[0086] the present invention connects a terminal holder to a cell. The cell is sealed air-tight at its connection between a sheathing case and a sealing plate. The sealing plate has a terminal protruding from its surface. The terminal holder is made of an insulating material and provides a storage space adjacent to the sealing plate for storing a protective component. The protective component is provided in the storage space between the terminal holder and the sealing plate. The protective component is placed in the storage space provided between the terminal holder and the sealing plate except for the terminal location, and its bottom surface level is positioned under the top surface level of the terminal.

25 Claims, 5 Drawing Sheets

BATTERY PACK

This application is based on applications No. 11-44631 filed in Japan on Feb. 23, 1999 and No. 11-45790 filed in Japan on Feb. 24, 1999, the content of which incorporated hereinto by reference.

BACKGROUND OF THE INVENTION

The present invention relates to a battery pack including a protective component such as a thermal fuse or a PTC.

A battery pack includes a protective component to prevent its use under abnormal conditions. The protective component cuts the electric current off if the temperature of the battery raises abnormally high or the current is abnormally high. A thermal fuse or a PTC is used as this type of protective component. A thermal fuse does blowout so the current is cut if the battery temperature goes higher than a predetermined temperature. A PTC raises its electrical resistance rapidly so the current hardly flows if the temperature raises due to a high current.

A battery pack with built-in plural cylindrical batteries, as shown in FIG. 1, includes a built-in protective component 103 at the space between batteries 124 in a case 125. The protective component 103 can be built-in using the cleavage space between the cylindrical batteries efficiently. However, for a battery pack with built-in rectangular batteries, as shown in FIG. 2, since there is no space between the batteries, a space is provided between a battery 224 and a case 225 such that a printed circuit board 226 is placed therein, and a protective component 203 for the batteries 224 is provided on the printed circuit board 226.

The battery pack with the structure as shown in FIG. 2 requires a larger case 225, since it needs an extra space for providing the built-in protective component 203. In addition, it is difficult to fix the printed circuit board 226 and the protective component 203 at predetermined position between the case 225 and the battery 224 without displacing them. If the printed circuit board 226 or the protective component 203 are moved inside of the case 225, it would deteriorate the reliability, because the vibrations might cause malfunction. Furthermore, as shown in FIG. 2, the battery pack in which the protective component 203 is between the side of the battery 224 and the case 225 requires that the protective component 203 be separated from a terminal 208 of a sealing plate 205. Consequently the connection of the protective component 203 to the terminal 208 of the sealing plate 205 is troublesome, and an elongated lead plate 227 is required.

The present invention has been developed to solve these drawbacks. The object of the present invention is to provide a battery pack with a built-in protective component, which is wholly compact and includes a protective component built-in.

Further, another important object of the present invention is to provide a battery pack with a built-in protective component, in which the protective component can be fixed at a predetermined position without being moved thereafter.

Furthermore, another important object of the present invention is to provide a battery pack with a built-in protective component, in which the protective component can be connected to terminals of a sealing plate via short lead wire.

Rechargeable batteries like lithium ion rechargeable batteries, nickel hydrogen batteries, or nickel cadmium batteries are provided with a safety valve to prevent the explosion of an outer sheathing case if used under abnormal conditions. The safety valve opens to exhaust the gas inside of the battery if the internal pressure of the battery is abnormally high. Sometimes the internal pressure of a battery reaches an abnormally high level when gas is produced inside of the battery by over-current flow or overcharge. If the internal pressure of the battery is high, it is necessary to exhaust the gas by opening the safety valve since the pressure would lead to a dangerous condition causing the destruction of the sheathing case.

When the safety valve opens, the gas inside of the battery will be exhausted. At that time, solution may also be exhausted together with the gas. The electrolyte exhausted from the battery can flow into a charger on which the battery is mounted and damage the charger or electronic device.

If the electrolyte touches contact points of terminals, it corrodes them and causes insufficient contact. Also, if the electrolyte adheres to the printed circuit board, it cause some drawbacks like corrosion of the conductive portion or short circuits at the conductive portion due to migration.

In order to prevent these drawbacks, some chargers have been developed such as a charger provided with a drainage to easily exhaust the leaked electrolyte. The drainage of the charger can prevent large amount of leaked electrolyte to collect inside of the case. However it cannot exhaust the electrolyte completely. The electrolyte leaked from the battery adheres to the terminal contact of the charger and inner surface of the case, thus causes a malfunction. Further, it is difficult for electronic devices with built-in batteries inside of the case to provide a drainage for draining the electrolyte easily. For these reasons, a malfunction of electronic devices due to electrolyte leaked from batteries and accumulated inside of the case may occur.

The present invention has been been developed to solve these drawbacks. The second object of the present invention is to provide batteries which absorb electrolyte leaked from batteries so as to effectively prevent the damage of the electronic device due to the electrolyte.

The above and further objects and features of the invention will more fully be apparent from the following detailed description and accompanying drawings.

SUMMARY OF THE INVENTION

The battery pack with a built-in protective component of the present invention comprises a cell, a terminal holder and a battery protective component. The cell tightly seals an opening of a sheathing case with a sealing plate which has a terminal protruding from its surface. The terminal holder is arranged so that it covers the sealing plate of the cell, providing storage space to include the protective component between the sealing plate and the terminal holder. The terminal holder is made of an insulating material. The protective component is set in the storage space provided between the terminal holder and the sealing plate, except for a terminal portion, in which the lower part of the protective component is positioned lower than the upper end of the terminal.

The battery pack with the built-in protective component of this structure has an overall compact size even with a built-in protective component. In addition, the protective component is mounted at a predetermined position so that it does not move around thereafter. These features are achieved by a battery pack having a storage space between the sealing plate and the terminal holder, and by the protective component being positioned, other than the terminal portion, so that its lower portion is lower than the upper end of the terminal. The cell with its terminal protruding from the sealing plate is provided with the terminal holder while it covers the sealing plate so that storage space is defined provided, except where the terminal is located, by virtue of a protruding terminal. The battery pack of the present invention uses this storage space to store its protective component. The battery pack of this structure has an overall compact size while including its protective component inside within a fairly reduced space, utilizing a unique structure of the cell and the terminal holder so that the space can be effectively used.

Furthermore, the above battery pack has another advantageous feature in that the protective component is located and maintained at a predetermined position in ideal conditions regardless of the outer shape of the batteries. A storage space s provided for the protective component by configuring the terminal holder and peripheral structure of the sealing plate of the cell. Moreover, the battery pack of the present invention is still advantageous for easy connection with the protective component using a short lead wire, because the protective component can be placed near the terminal of the sealing plate.

The battery pack employs, for example, a thermal fuse or a PTC, as the protective component, and provides the protective component preferably in a storage space at the lower portion of the terminal holder, so that the protective component is close to the sealing plate of the cell.

Furthermore, the battery pack of the present invention may provide a preservation space between the terminal holder and the sealing plate such that an absorbent material is placed there to further prevent the damages caused by electrolyte.

The battery pack with this structure has the advantageous ability to absorb the electrolyte leaked from the battery and thus to effectively prevent the damages to the electronic device due to the electrolyte. In addition, the battery pack of this structure also has the advantageous ability to efficiently prevent damage to the electronic device due to the electrolyte by effectively absorbing the electrolyte of the battery, because an absorbent material is placed in the preservation space provided between the sealing plate of the cell and the terminal holder.

Nevertheless, because the preservation space for absorbent material is provided by the unique configuration of the terminal holder and the peripheral structure of the sealing plate of the cell, the battery pack can use this space so efficiently that the absorbent material is provided, and can easily and precisely locate the absorbent material at prescribed location.

DETAILED DESCRIPTION OF THE INVENTION

Figure 1:
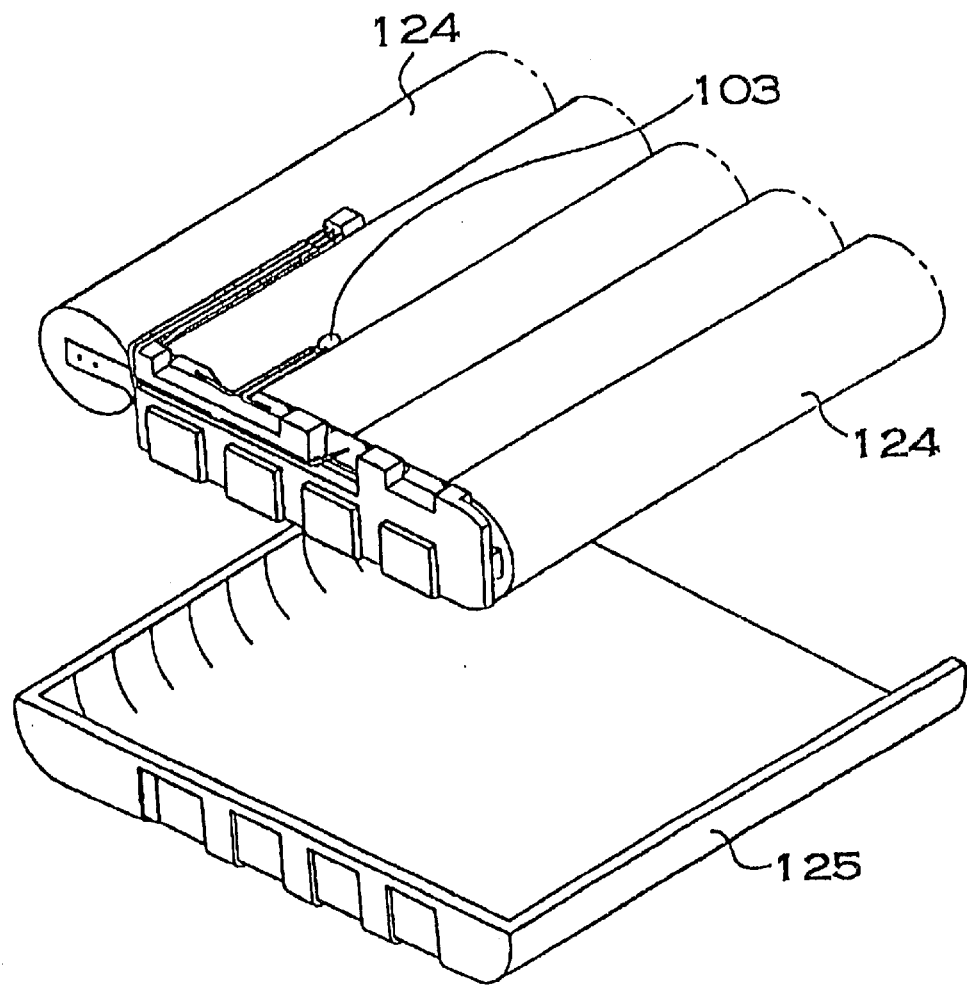
FIG. 1 is an exploded oblique view of a prior art example of a battery pack with a built-in protective component.
Figure 2:
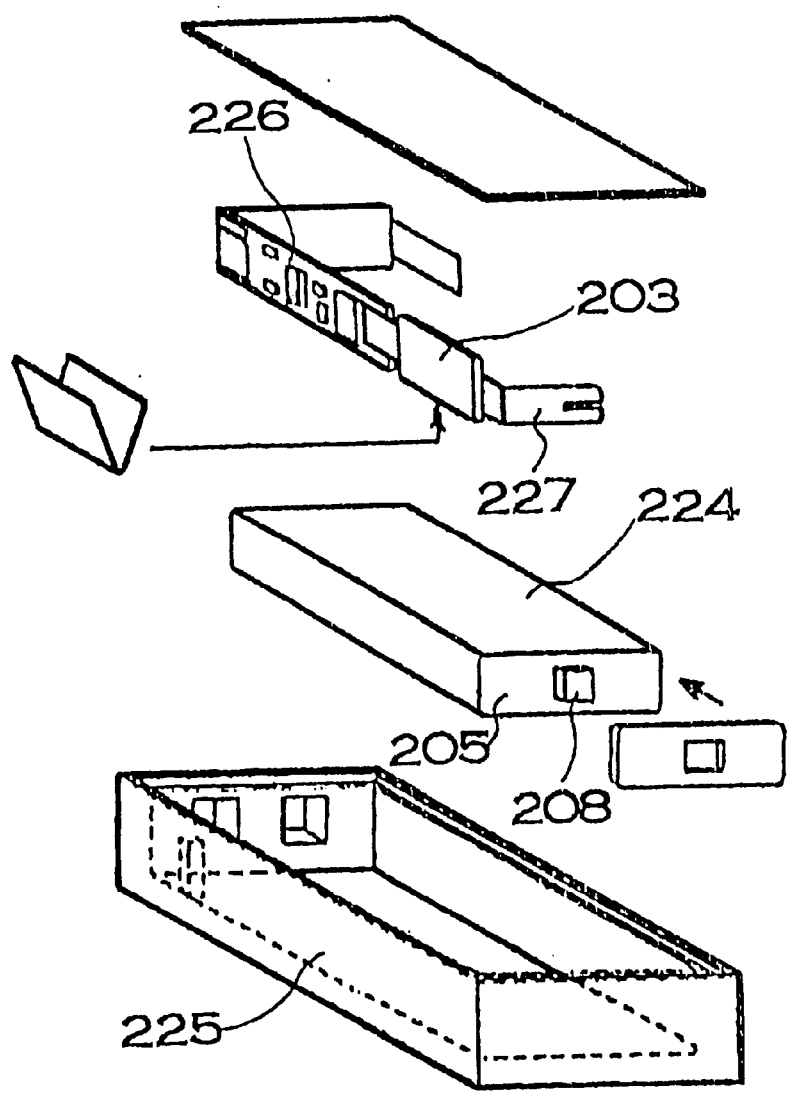
FIG. 2 is an exploded oblique view of another prior art example of the battery pack with a built-in protective component.
Figure 3:
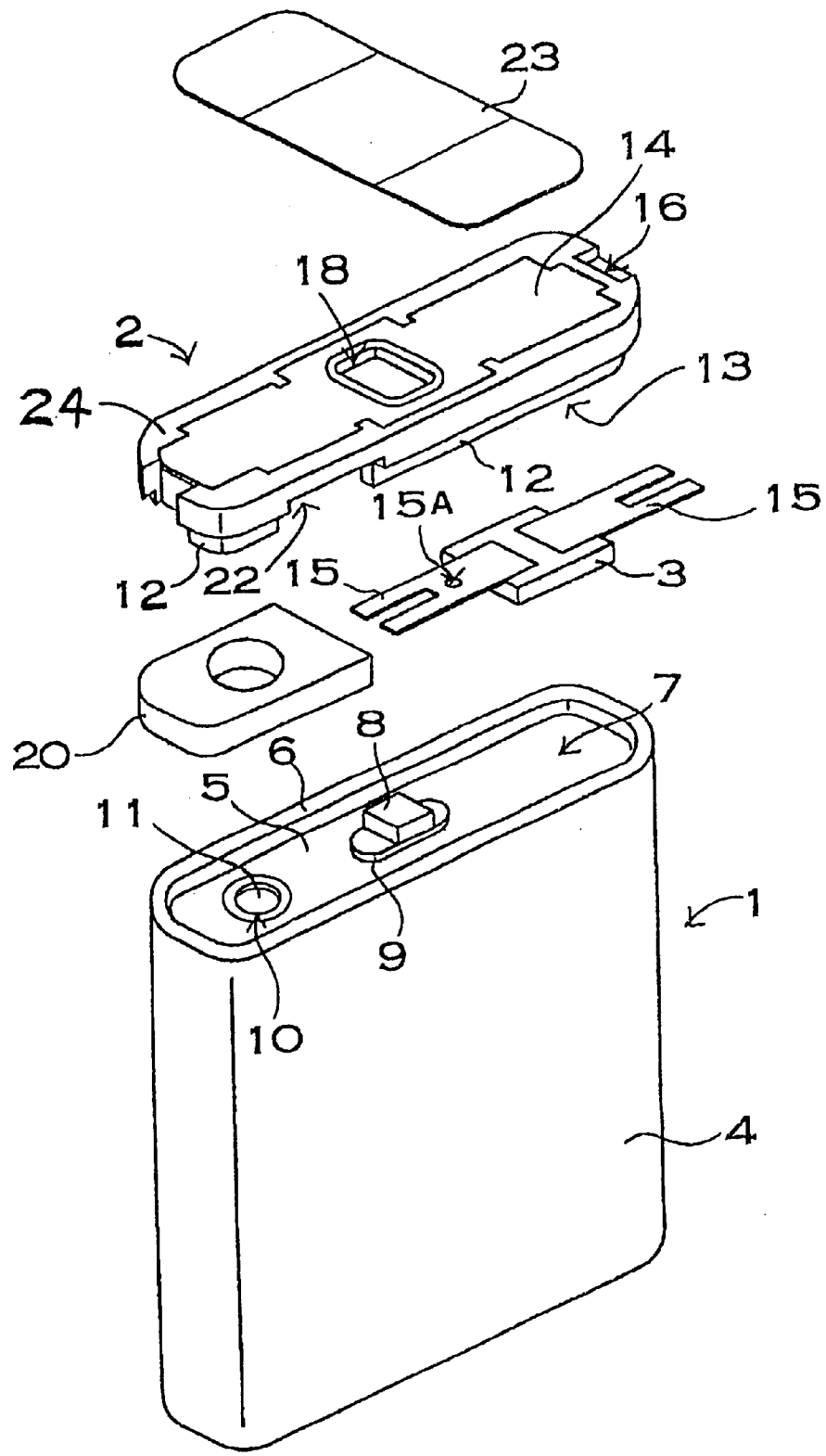
FIG. 3 is an exploded oblique view of the embodiment of the present invention of a battery pack with a built-in protective component.

A battery pack shown in an exploded oblique view of FIG. 3 comprises a cell 1, a terminal holder 2, moisture absorbent material 20 and a protective component 3. At the cell 1, an opening of a sheathing case 4 is sealed air-tight by the sealing plate 5. Furthermore, a cell flange 6 is provided at the circumference of the sealing plate 5 of the cell 1, protruding to define a hollow section 7 within the cell flange 6. For the cell 1 in FIG. 1, the cell flange 6 is configured by protruding the rim of the opening of the sheathing case 4 from the sealing plate 5 as the opening edge of the sheathing case 4. This cell was manufactured by introducing the sealing plate 5 into the opening of the sheathing case 4, then laser-welding the sealing plate 5 and the sheathing case 4 such that the sheathing case 4 was sealed air-tight.

The sheathing case 4 is manufactured by presswork of metallic sheet like aluminum, aluminum alloy or metalclad iron sheet to form a fistulous container with a sealed bottom side. The sheathing case 4 in FIG. 3 has a shape of which a cylindrical or cylindroid cylinder is pressed with particular thickness. Also, the sheathing cases may be a rectangular, cylindrical or cylindroid cylinder (not illustrated).

The sealing plate 5 is fixed so that terminal 8 is a center. The terminal 8 is fixed air-tight and insulated from metallic sealing plate 5 via insulating packing 9. The terminal 8 protrudes from the surface of the sealing plate 5. Although the cell 1 shown in this figure has no built-in safety valve inside of the terminal 8 at the sealing plate 5, a safety valve can be provided inside of the terminal. The terminal with a built-in safety valve is provided with a perforation hole to exhaust gas trapped inside the sheathing case. The battery pack provided with a safety valve at the terminal can absorb and eliminate an electrolyte leaked through the perforation hole by using the absorbent material.

The sealing plate 5 shown in FIG. 3 has a leaking hole 10 at a location other than the terminal 8, and a safety valve 11 is provided on the leaking hole 10. The safety valve 11 is composed of a thin film which is broken by the internal pressure of the battery, the thin film being fixed air-tight at the inner face of the leaking hole 10. The thin film of the safety valve 11 seals the leaking hole 10 air-tight when the internal pressure of the battery is lower than the predetermined pressure. If the internal pressure of the battery is higher than the predetermined pressure, the film is broken so that the gas trapped inside the battery is exhausted outside.

Figure 4:
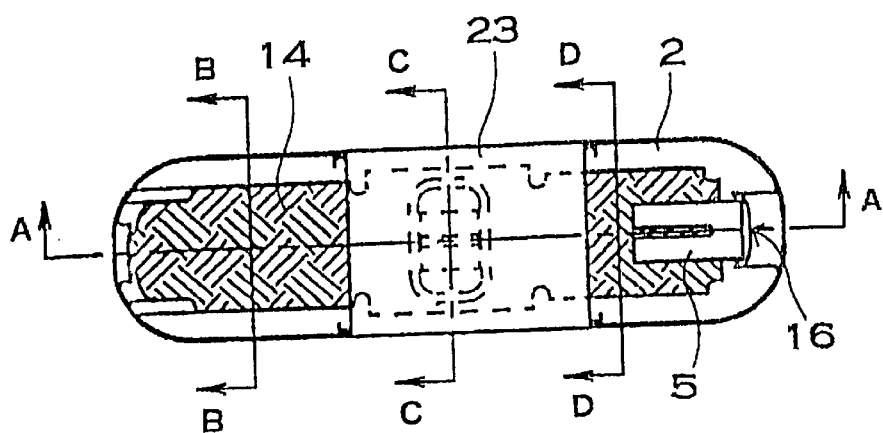
FIG. 4 is a plane view of the embodiment of the present invention of the battery pack with a built-in protective component.

A terminal holder 2 has an attachment flange 12 protruding downwardly, the attachment flange 12 being inserted into the hollow section 7 of the cell 1. Furthermore, the terminal holder 2 has a storage space 13 to hold a protective component 3 for the battery and a preservation space 19 to hold the absorbent material 20 at the lower face. This terminal holder 2 includes a frame 24 made of an insulating material like plastic and the like, and a terminal plate 14 fixed at an upper face of the frame. It is easy to mass-produce the terminal holder 2 efficiently by insertion forming of the metallic terminal plate 14. As shown in FIG. 3 and FIG. 4, the terminal plate 14 has a shape which substantially covers the upper side of the terminal holder 2, rather than just its circumference.

Figure 5:
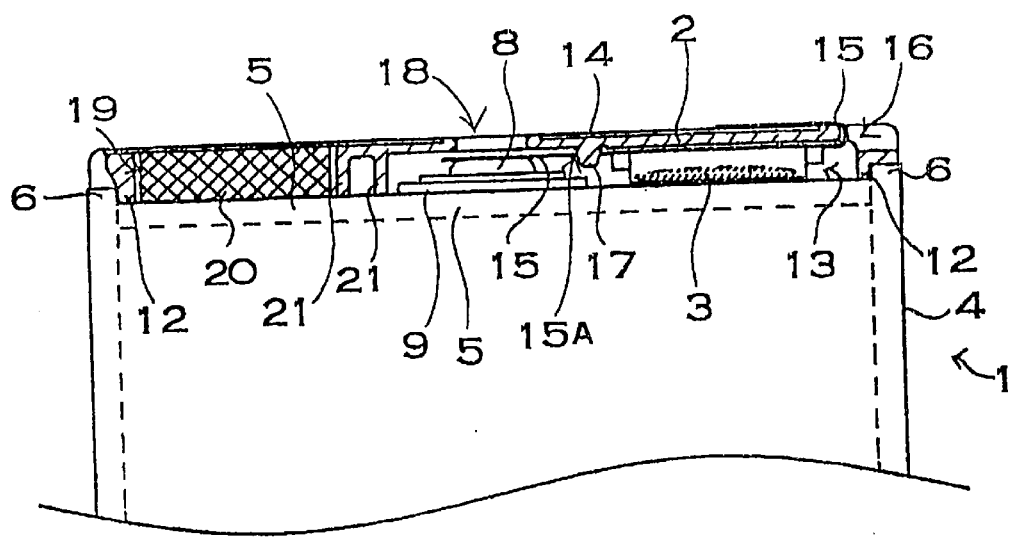
FIG. 5 is a cross sectional view taken along line A—A of the battery pack shown in FIG. 4.
Figure 6:
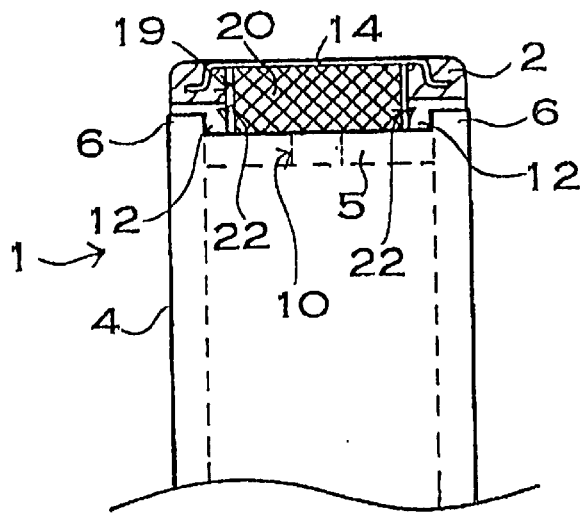
FIG. 6 is a cross sectional view taken along line B—B of the battery pack shown in FIG. 4.
Figure 7:
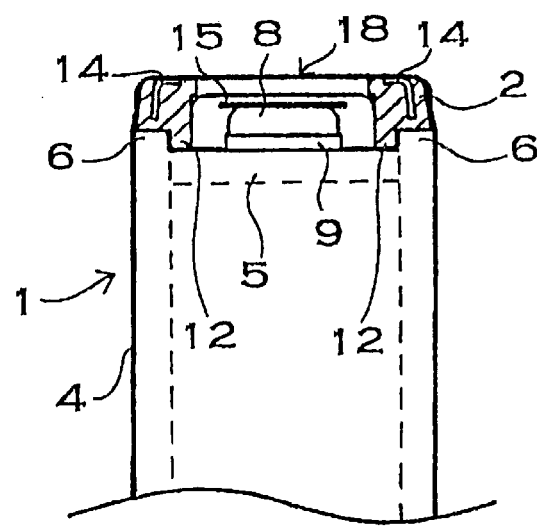
FIG. 7 is a cross sectional view taken along line C—C of the battery pack shown in FIG. 4.
Figure 8:
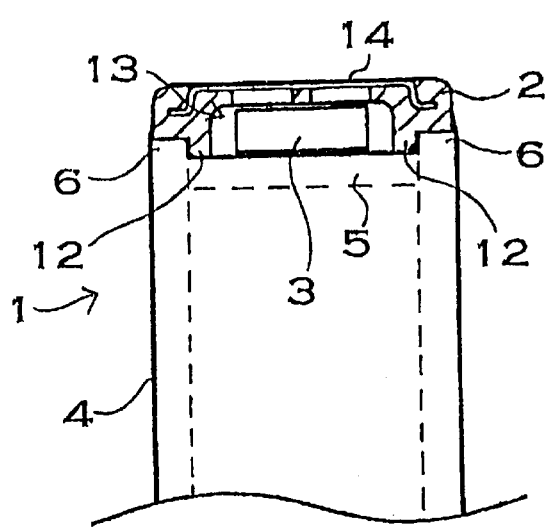
FIG. 8 is a cross sectional view taken along line D—D of the battery pack shown in FIG. 4.

The terminal holder 2 shown in FIG. 3 provides a rib at its circumference protruding downwardly so as to form an attachment flange 12. The rib forms a ditch on the outer circumference so that the flange 6 provided on the brim of the cell 1 is inserted into the ditch. FIG. 5 and FIG. 6 show the insertion of the flange 6 of the cell 1 into the rib of the terminal holder 2. The terminal holder 2 has the storage space 13 to hold the protective component 3 and the preservation space 19 to hold the absorbent material 20 provided inside of the rib.

The protective component 3 mounted in the storage space 13 has a first lead 15 contacted the top side of the terminal 8 of the sealing plate 5, and a second lead 15 connected to the terminal plate 14. The body of the protective component 3 is connected to the lower side of the lead, and this body is provided in the storage space 13.

The protective component 3 is held between the sealing plate 5 and the terminal holder 2, and is located in the storage space 13 in addition to the terminal 8, so that the protective component 3 is held right of the terminal 8. The lower side of the protective component 3 is positioned lower than the top side level of the terminal 8. In order to go through the lead 15 of the protective component 3 (which is mounted in the terminal holder 2) from the lower side of the terminal holder 2 to its upper side, the penetration hole 16 is provided at the edge of the terminal holder 2, according to FIG. 5, at the right hand edge of the terminal holder 2.

Furthermore, the terminal holder 2 shown in FIG. 5 has a protrusion 17 integrally, which protrudes downwardly so as to insert into a small hole 15A opened at the first lead 15 of the protective component 3 to hold the protective component 3 at the correct position. The terminal holder 2 with this structure allows the setting of the protective component 3 at a precise position in the storage space 13. This is because the protrusion 17 of the terminal holder 2 is inserted into the small hole 15A opened in the first lead 15 of the protective component 3 so that the protective component 3 is set at a decided position. In addition, the protective component 3 may be connected with the terminal holder 2 by heat welding the protrusion 17 inserted into the small hole 15A.

The terminal holder 2 shown in this Fig. has a connecting hole 18 at the center penetrating therethrough to connect the lead 15 of the protective component 3 to the terminal 8 of the sealing plate 5. The connecting hole 18 also goes through the terminal plate 14 attached to the terminal holder 2. The lead 15 of the protective component 3 is connected to the terminal 8 by introducing an electrode rod for spot welding through the connecting hole 18 and spot-welding them.

According to FIG. 5, the terminal holder 2 shown in this Fig. has the storage space 13 at the right side and the preservation space 19 at the left side to hold the absorbent material 20. The preservation space 19 is surrounded by the rib 12 and the upper side is enclosed by the terminal plate 14 inserted into and fixed on the terminal holder 2. At the border between the preservation space 19 and the storage space 13, a partition 21 is provided, and the partition 15 connected to the surrounding rib. The partition 21 divides the preservation space 19 and the storage space 13, and prevents the electrolyte, which has leaked and been absorbed by the absorbent material 20, from leaking outside. The partition 21 shown in this figure has a 2 row structure to secure to prevent the leaked electrolyte in the absorbent material 20 from leaking from the preservation space 19. As shown in FIG. 3 and 4, the rib provided in the terminal holder 2 peripherally to form the preservation space 19 has a notch section 22 to exhaust the gas passed through the safety valve 11 outside.

The absorbent material 20 absorbs and maintains the electrolyte leaked from the battery. The absorbent material is material such as a non-woven fabric aggregated by fine fibers solidly, filter paper or a minute open-cell plastic foam. The absorbent material 20 is sized so as to be inserted into the preservation space 19, in other words, a shape and size substantially the same as or slightly smaller than the inner size of the preservation space 19. Also the absorbent material 20 has an intake hole 20A which corresponds to a leaking hole 10 of the safety valve 11.

The thickness of the absorbent material 20 is substantially the same as the height of the preservation space 19 or slightly thicker than the height of the preservation space 19 when not being pressed, so that it can be stored slightly compressed into the preservation space 19. This absorbent material 20 lays so that its bottom is on the sealing plate 5 so that it absorbs the electrolyte drained from the safety valve 11 effectively. Furthermore, the absorbent material 20 with the intake hole 20A facing the leaking hole 10 of the sealing plate 5 does not seal the opening of the leaking hole 10. For this reason, the safety valve 11 allows smooth exhaustion of the leaking electrolyte and gas through the leaking hole 10. The gas exhausted through the leaking hole 10 is led to the intake hole 20A and ejected through the absorbent material 20. The electrolyte is absorbed by the absorbent material 20 from the intake hole 20A. Alternatively, the intake hole of the absorbent material may be at the lower side, while sealing the upper side without penetrating therethrough.

The protective component 3 comprises a thermal fuse which blow out at a predetermined temperature. The thermal fuse is blown out to cut the current of the cell 1 off when the temperature of the cell 1 is higher than the set temperature. However the battery pack of the present invention does not limit a protective component 3 to a thermal fuse. Instead of a thermal fuse, a PTC may be used as a protective component 3. A PTC increases electrical resistance dramatically at a predetermined temperature such that the current flowing the cell 1 is extremely reduced, and is substantially cuts the current off.

The protective component 3 connects the lead 15 at both ends. The lead 15 is made by a thin metallic plate, which is connected to the terminal 8 and the terminal plate 14 by spot welding. As shown in FIGS. 4 and 5, the lead 15 inserted into the through hole 16 of the terminal holder 2 is bent along the terminal holder 2 and connected to the upper side of the terminal plate 14 by welding.

The battery pack with the above mentioned structure is manufactured by following steps.

1. Making the terminal holder 2 which holds terminal plate 14 of plastic.

2. Setting the protective component 3 into the storage space 13 of the terminal holder 2, and connecting the lead 15 of the protective component 3 to the terminal plate 14. It may be made by inserting the protrusion 17 provided on the terminal holder 2 into the small hole 15A opened in the lead 15 of the protective component 3, then pushing the protrusion 17 to temporarily hold the protective component 3 to the terminal holder 2.

3. Setting the absorbent material 20 into the preservation space 19 of the terminal holder 2. The absorbent material 20 is inserted into the preservation space 19 and maintained at a predetermined position. The absorbent material may be glued to the inner face of the terminal holder.

4. Inserting the attachment flange 12 of the terminal holder 2 into the hollow section 7 of the cell 1 to attach the terminal holder 2 to the cell 1 at the predetermined position. Here, some adhesive is applied at the lower side of the protective component 3 and adheres on the surface of the sealing plate 5. Further, it may be possible to apply adhesive to the bottom side of the absorbent material and adhere it to the surface of the sealing plate.

5. Inserting the electrode rod into the connection hole 18 of the terminal holder 2 while the terminal holder 2 is attached to the cell 1 at the predetermined position, and welding the lead 15 of the protective component 3 to the terminal 8.

6. As shown in FIG. 3 and 4, adhering a film 23 to the terminal holder 2 and the sheathing case 4 of the cell 1 such that the terminal holder 2 is connected to the cell 1. In the battery shown in FIG. 5, the terminal holder 2 is fixed to the sheathing case 4 by mean of an adhesive film. However the terminal holder and the cell may be connected by film like a heat-shrinkable film.

Then, the lead plate pulled out the sheathing case 4 and the terminal plate 14 are welded and inserted into the case. The terminal holder 2 with the terminal plate 14, and the sheathing case 4 may be covered with a heat-shrinkable film thereby to form the battery pack.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. A battery pack comprising:
   an air-tight cell including a sheathing case having an opening and including a sealing plate covering said opening so as to form an air-tight seal between said sheathing case and said sealing plate, said sealing plate having an outer surface facing away from an interior of said sheathing case and having a terminal extending from said outer surface, said terminal having a top surface facing away from said sheathing case of said cell;
   a protective component for detecting a temperature of said cell, and for limiting a current flow from said cell based on the detected temperature of said cell; and
   a terminal holder formed of an insulating material and positioned on said cell so as to cover said sealing plate of said cell and so as to define a storage space between said sealing plate and said terminal holder, said protective component being positioned within said storage space in an area adjacent to said terminal of said sealing plate, said protective component having a bottom surface facing said cell and said protective component being arranged such that said bottom surface is located closer to said outer surface of said sealing plate than is said top surface of said terminal.

2. A battery pack as recited in claim 1, wherein said sealing plate has a through-hole, said cell further including a safety valve at said through-hole, said safety valve being operable to open if an internal pressure of said cell exceeds a predetermined pressure.

3. A battery pack as recited in claim 2, wherein said protective component is located at a first side of said terminal, and said through-hole is located at a second side of said terminal opposite said first side.

4. A battery pack as recited in claim 1, wherein said protective component is operable to stop a current flow from said cell based on the detected temperature of said cell.

5. A battery pack as recited in claim 1, wherein said cell has a cell flange protruding around a rim of said sealing plate, said terminal holder having an attachment flange protruding around a periphery thereof, said attachment flange being inserted into an inner side of said cell flange so as to form said storage space between said terminal holder and said sealing plate.

6. A battery pack as recited in claim 1, wherein said protective component includes a body and leads, a first lead of said protective component having a bottom surface facing said cell, said first lead being connected to said top surface of said terminal, said body of said protective component being connected to said bottom surface of said first lead.

7. A battery pack as recited in claim 6, wherein said terminal holder includes a terminal plate on an outer surface of said terminal holder, a second lead of said protective component being arranged so as to penetrate through said terminal holder and connect to said terminal plate.

8. A battery pack as recited in claim 1, wherein said protective component is adhered to said outer surface of said sealing plate.

9. A battery pack as recited in claim 1, wherein said protective component includes a lead having a hole therein, said terminal holder having a protrusion protruding towards said sealing plate and being inserted into said hole so as to maintain said protective component at a predetermined location.

10. A battery pack as recited in claim 9, wherein said protrusion is inserted into said hole such that said protective component is connected to said terminal holder.

11. A battery pack as recited in claim 1, wherein said protective component includes a lead, said terminal holder having a connection through-hole at a center thereof for providing access to connect said lead of said protective component to said terminal of said sealing plate.

12. A battery pack as recited in claim 1, wherein said opening of said sheathing case has a rim protruding away from said sealing plate so as to form a cell flange.

13. A battery pack a recited in claim 1, further comprising a film connecting said terminal holder to said sheathing case.

14. A battery pack as recited in claim 1, wherein said sheathing case of said cell has one of a rectangular, cylindrical, and a cylindroid shape.

15. A battery pack as recited in claim 1, wherein said terminal holder includes a frame formed of plastic, and a terminal plate formed of a metal sheet inserted into and fixed to said frame.

16. A battery pack as recited in claim 1, wherein a preservation space is defined between said sealing plate and said terminal holder in an area adjacent to said terminal, and an absorbent material for absorbing electrolyte leaked from said cell is provided in said preservation space.

17. A battery pack as recited in claim 16, wherein said sealing plate has a through-hole, said cell further including a safety valve at said through-hole and formed of a film, said safety valve being operable to open if an internal pressure of said cell exceeds a predetermined pressure.

18. A battery pack as recited in claim 16, wherein said terminal holder includes a partition arranged to divide said terminal holder so as to form said storage space and said preservation space.

19. A battery pack as recited in claim 16, wherein said preservation space is defined by a rib and has an upper side sealed by a terminal plate attached to an upper side of said terminal holder.

20. A battery pack as recited in claim 19, wherein said rib arranged to define said preservation space has a notch for exhausting gas from said cell.

21. A battery pack as recited in claim 20, wherein said sealing plate has a through-hole, said cell further including a safety valve at said through-hole, said safety valve being operable to open if an internal pressure of said cell exceeds a predetermined pressure so as to allow the gas in said cell to pass therethrough.

22. A battery pack as recited in claim 16, wherein said absorbent material comprises one of a non-woven fabric material aggregated by fine fibers, filter paper, and a minute open-cell plastic foam.

23. A battery pack as recited in claim 16, wherein said absorbent material is substantially the same size as said preservation space and has an intake hole.

24. A battery pack as recited in claim 23, wherein said sealing plate has a through-hole, said cell further including a safety valve at said through-hole, said safety valve being operable to open if an internal pressure of said cell exceeds a predetermined pressure, a location of said through-hole corresponding to a location of said intake hole of said absorbent material.

25. A battery pack as recited in claim 16, wherein said absorbent material is adhered to said outer surface of said sealing plate.

* * * * *